United States Patent

Matthews

[11] Patent Number: 5,533,852
[45] Date of Patent: Jul. 9, 1996

[54] FASTENER BEARING ASSEMBLY

[76] Inventor: Norman L. Matthews, Level R1, 1 Havelock Street, West Perth, Australia, 6005

[21] Appl. No.: 232,024
[22] PCT Filed: Oct. 30, 1992
[86] PCT No.: PCT/AU92/00586
§ 371 Date: Jun. 29, 1994
§ 102(e) Date: Jun. 29, 1994
[87] PCT Pub. No.: WO93/09355
PCT Pub. Date: May 13, 1993

[30] Foreign Application Priority Data

Nov. 1, 1991 [AU] Australia ..................... 9267
Nov. 11, 1991 [AU] Australia ..................... 9419

[51] Int. Cl.6 .................... F16B 37/00; F16B 43/00
[52] U.S. Cl. ................ 411/534; 411/428; 411/902
[58] Field of Search ...................... 411/120, 149, 411/428, 534, 902, 903, 908, 150

[56] References Cited

U.S. PATENT DOCUMENTS 2,518,468  8/1950  Harding ............... 411/428 X
4,619,559 10/1986  Norris .
4,984,938  1/1991  Scott, Jr. et al. ........... 411/534 X
5,232,311  8/1993  Stankus ..................... 411/534

FOREIGN PATENT DOCUMENTS 1262330  4/1961  France .
 867013  3/1961  United Kingdom .
1317319  5/1973  United Kingdom .
WO92/04549  3/1992  WIPO .

Primary Examiner—Neill R. Wilson
Attorney, Agent, or Firm—Nixon & Vanderhye

[57] ABSTRACT

A fastener bearing assembly for reducing the turning friction between a head of a fastener and an object to be fastened, for example, a vehicle wheel. The assembly comprises a first part having a first pressure transmitting surface and a second part having a second pressure transmitting surface, and adapted to rotatably receive the first pressure transmitting surface in facing relation thereto. A solid dry lubricant material in the form of an annulus is provided to reduce friction between the first and second pressure transmitting surfaces. In use, the first part rotates with the head of the fastener and the second part remains stationary relative to the surface of the fastened object so that the dry lubricant annulus acts as a bearing between the head of the fastener and the fastened object. A locking member adapted to engage a surface of both the first and second parts may be provided to prevent rotation of the first and second parts relative to one another.

11 Claims, 4 Drawing Sheets

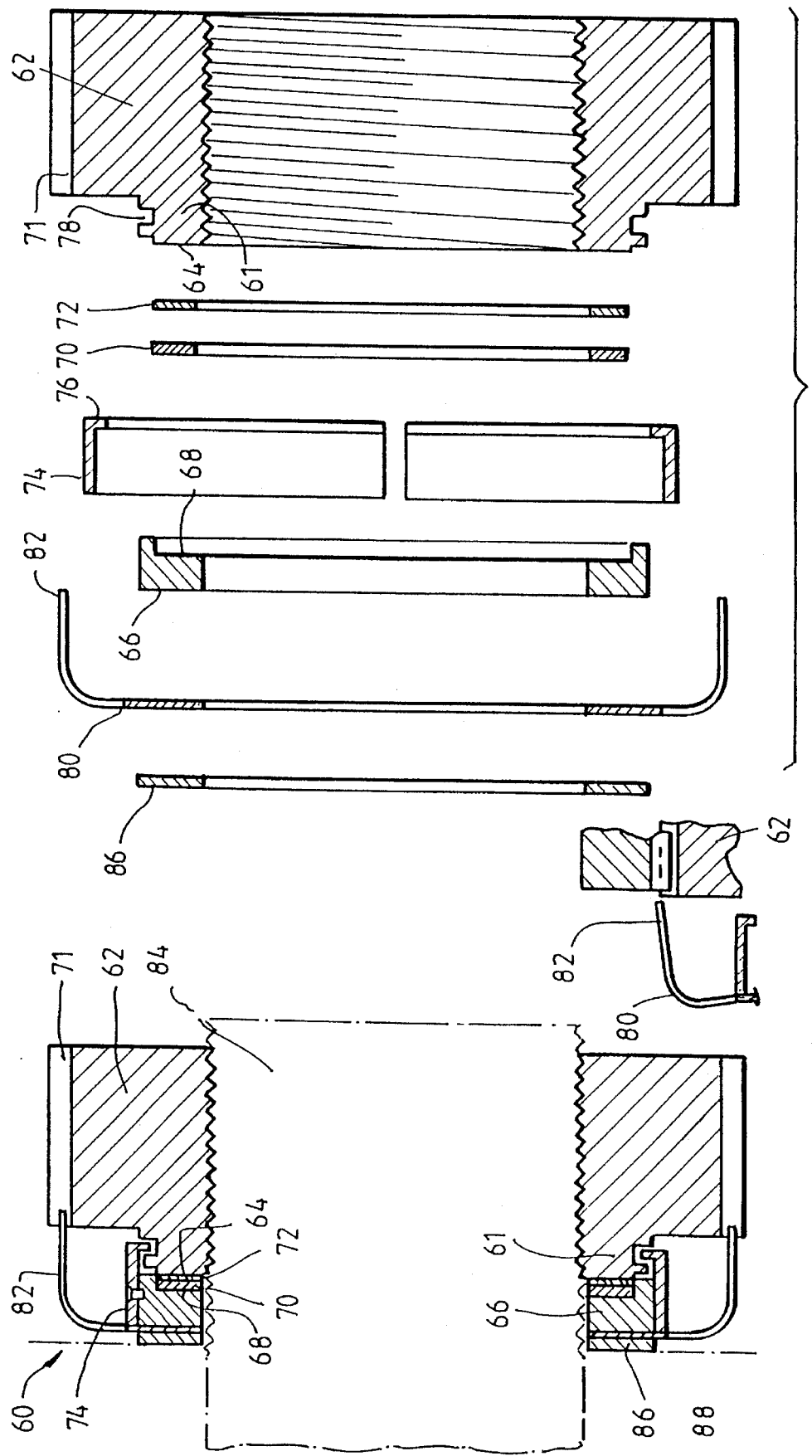

FASTENER BEARING ASSEMBLY

FIELD OF THE INVENTION

The present invention relates to a fastener bearing assembly for reducing the friction between a head of a fastener and an object to be fastened, and relates particularly, though not exclusively, to a bearing assembly for an automotive fastener such as, for example, a wheel nut or stud or an engine head bolt.

BACKGROUND TO THE INVENTION

A conventional wheel nut, stud or bolt comprises a head portion designed to receive a wheel spanner, a threaded portion to screw onto the wheel axle flange and a tapered cone portion shaped to engage in a matching shaped recess provided in the wheel. Sometimes the cone portion is provided separate from the head portion and sometimes the fastener is further provided with a conventional loose washer behind the cone.

In whatever form the wheel fastener is conventionally made, when tightened a high degree of friction is involved, namely, friction on the threaded portion, friction on the wheel recess and friction on the cone portion contacting the wheel recess. This latter friction is particularly high, and tends to be greater during loosening than during tightening, ie., it requires more torque to loosen the fastener than to tighten the same fastener. This is the primary reason why conventional wheel nuts are often so hard to remove. It is also necessary to apply a large torque to a conventional wheel nut during fastening in order to overcome the friction and still obtain the necessary hold-down pressure. Conventionally, friction is assumed and even taught to be necessary and is relied upon to hold the fastener securely, however a recent discovery suggests that this need not be the case.

These problems with conventional wheel fasteners become critical in relation to racing cars where rapid and effective wheel changes must be performed in race time. A stubborn wheel fastener will cause loss of valuable time that could be the difference between winning and losing. Furthermore, it is essential that the correct torque be applied to the wheel fasteners when tightened, and this can be difficult to achieve in the very short time available, with conventional fasteners.

The present invention was developed with a view to providing a fastener bearing assembly that can be used with wheel fasteners to virtually eliminate a high proportion of the friction between a conventional wheel fastener cone, and the wheel fastener recess. In one embodiment, the invention also provides a wheel fastener which incorporates the bearing assembly therein. Although the invention will be described with particular reference to automotive wheel and engine head fasteners, it is to be understood that the fastener bearing assembly is not limited to automotive fasteners and can be used in any application to minimise friction between a fastener and the object to be fastened.

A further problem with conventional wheel fasteners is the problem of theft of vehicle wheels or inadvertent loosening of the wheels while driving. Conventional wheel nuts/studs can be relatively easily removed with an appropriate wheel brace once the hub cap is removed. Various means have been proposed to improve security and inhibit thieves, including the provision of a key operated lock in a wheel stud and/or the hub cap. This type of lock is not entirely satisfactory as it requires the vehicle operator to carry an additional key as well as a conventional wheel brace.

The problem of on-road loosening of wheel fasteners is particularly acute with long-haul trucks and other transport vehicles which have a large number of wheels that not infrequently require replacement. If the wheel fasteners have not been properly fastened during replacement of a wheel they can work loose and instances of a truck wheel actually falling off in transit are not uncommon.

The present invention was also developed with a view to providing a novel fastener that can be secured more effectively against unauthorised or inadvertent loosening.

SUMMARY OF THE INVENTION

According to one aspect of the present invention there is provided, a fastener bearing assembly for reducing the turning friction between a head of a fastener and an object to be fastened by the fastener, the assembly comprising:

a first part having a first pressure transmitting surface;

a second part having a second pressure transmitting surface, and adapted to rotatably receive said first pressure transmitting surface of the first part in facing relation thereto; and, a solid dry lubricant material having a low coefficient of friction provided to reduce friction between said first and second pressure transmitting surfaces whereby, in use, said first part can rotate with the head of the fastener and said second part can be held stationary relative to the fastened object so that said dry lubricant material can act as a bearing between the head of the fastener and the fastened object.

Preferably, said solid dry lubricant material is provided in the form of a separate annulus located between said first and second pressure transmitting surfaces.

Preferably the assembly further comprises containment means provided in connection with said first and/or second parts for containing said solid dry lubricant material therein whereby, in use, said solid dry lubricant material is capable of withstanding substantial compressive loads without being extruded from between the first and second parts.

Typically one of said first or second parts is provided with an annular recess forming a female containment portion, said annular recess having an inside diameter sized to receive said annulus therein. Typically the other one of said first or second parts comprises a male portion having an outside diameter smaller than said inside diameter of the annular recess, and adapted to be rotatably received within said female portion, whilst at the same time in pressure transmitting contact with the solid dry lubricant material.

Advantageously, the assembly further comprises a washer of hard, rigid material having at least one smooth pressure transmitting surface, said washer also typically being provided between the first and second pressure transmitting surfaces with said smooth pressure transmitting surface bearing against said solid dry lubricant material.

In one embodiment, means are included to keep the bearing surfaces in close (dirt and possibly water excluding) contact, under pressure even when the fastener is removed. For example, the parts may be held together with a circlip and the pressure produced by concaving the washer.

In one embodiment, said first part of the assembly is provided integral to the head or body of the fastener itself and comprises the male portion. In another embodiment, said first part is in the form of a washer and comprises the male portion.

Advantageously, the assembly further comprises a locking member adapted to engage a surface of both the first and second parts to prevent rotation of the first and second parts relative to one another whereby, in use, said fastener can be inhibited from loosening due to vibration.

Preferably, the locking member also engages the head of the fastener so that the assembly is prevented from rotating relative to the fastener.

Advantageously, the first part is provided with a positive gripping surface adapted to engage the head of the fastener and the second part is likewise provided with a positive gripping surface adapted to engage the object to be fastened. The positive gripping surface may be provided in the form of projections or grooves shaped to align with a matching surface.

Although the invention is described with particular reference to wheel fasteners and automotive fasteners generally, it will be obvious that the fastener bearing assembly can be employed with many other types of fasteners in numerous other applications and that it's utility is not restricted to the field of automotive fasteners.

BRIEF DESCRIPTION OF THE DRAWINGS

In order to facilitate a better understanding of the nature of the invention, several preferred embodiments will now be described, by way of example only, with reference to the accompanying drawings in which:

FIGS. 4(a) and (b) illustrate another embodiment of the fastener bearing assembly incorporated in a wheel nut;

FIG. 4(c) is a fragmentary exploded cross-sectional view illustrating a locking member for locking the wheel nut to the shaft;

DETAILED DESCRIPTION OF PREFERRED EMBODIMENTS

Figure 1A:
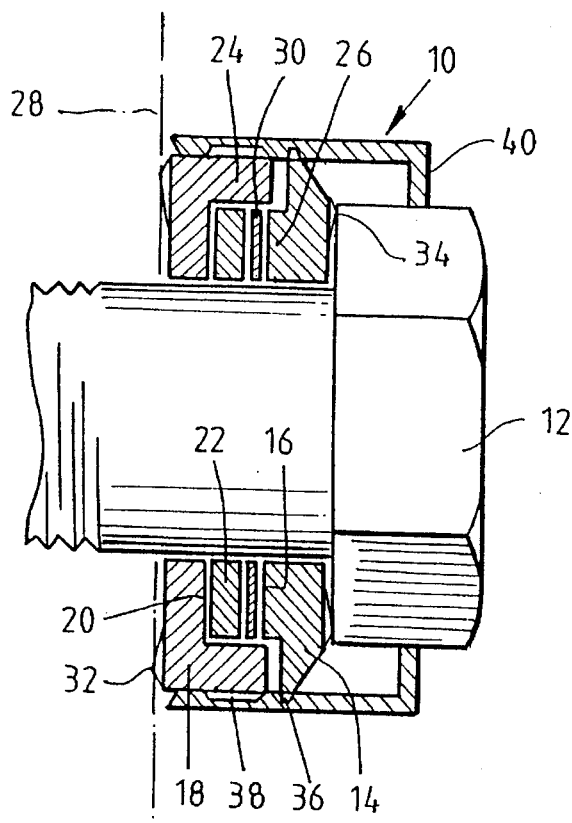
FIGS. 1(a), (b), (c) and (d) illustrate a first embodiment of the fastener bearing assembly shown on a bolt.

Referring to FIG. 1, a first embodiment of the fastener bearing assembly 10 according to the invention is illustrated fitted on a bolt 12. The bearing assembly 10 comprises a first part 14 having a first pressure transmitting surface 16, and a second part 18 having a second pressure transmitting surface 20. The second part 18 is adapted to rotatably receive the first pressure transmitting surface 16 of the first part 14 in facing relation thereto. Located between the first and second pressure transmitting surfaces 16, 20 is provided a solid dry lubricant material 22, typically in the form of an annulus, the second part 18 being provided with an annular recess formed by lip 24 having an inside diameter sized to receive said annulus 22 therein. The second part 18 thus forms a female containment portion of the assembly for containing the annulus 22. The first part 14 includes a male portion in the form of a boss 26 having an outside diameter smaller than the inside diameter of the annular lip 24, and adapted to be rotatably received therein.

As can be seen most clearly in FIG. 1(a) the first part 14 of the assembly 10 is located with an upper face abutting against a lower face of the head of the fastener 12 so that it can rotate with the head of the fastener 12. the second part 18 is located with a lower face abutting against the surface 28 of the object to be fastened and can therefore be held stationary relative to the fastened object. The solid dry lubricant annulus 22 provided between the first and second pressure transmitting surfaces 16, 20 therefore acts as a bearing between the head of the fastener and the fastened object and substantially reduces the turning friction between the head of the fastener and the object. Hence, the torque required to tension the bolt and produce the necessary hold-down pressure is greatly reduced, since it does not need to overcome this friction. Furthermore, the fastener can also be undone easily and the head face corrosion problem of conventional fasteners can be overcome.

The fastener bearing assembly 10 may further comprise a washer 30 of hard, rigid material having at least one smooth pressure transmitting surface which bears against the solid dry lubricant material 16. The washer may be dished so that when compressed between the first and second parts it's outer periphery seals the contact surfaces from the ingress of contaminants. Advantageously, the washer 30 is manufactured from stainless steel and is provided so that the first and second parts 14, 18 can be manufactured at low cost by stamping from the same metal material used for manufacturing conventional washers. If the bearing assembly is to be used where high temperatures are experienced by the fastener, the second part 18 can be manufactured from, or coated with a heat resistant, for example, ceramic material and/or may be provided with vanes on its outer periphery to disperse heat.

The female portion 18 of the assembly together with the shank of the fastener 12 effectively contains the solid lubricant annulus 22 therein and thus enables the lubricant to withstand much greater compressive loads by restricting spreading. The lubricant annulus 22 may be tightly received within the annular lip 24 in a fixed position or may be free to rotate.

Figure 1B:
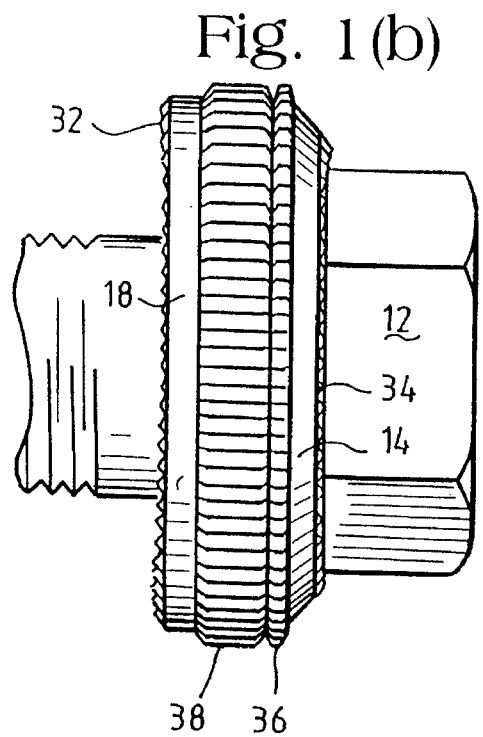

As can be seen most clearly in FIG. 1(b), (c) and (d) the upper and lower surfaces respectively of the first and second parts 14, 18 are provided with radially extending protrusions 34, 32 providing a positive gripping surface adapted to engage the lower face of the fastener 12 and the surface 28 of the object to be fastened respectively. The lower face of the fastener 12 may likewise be provided with matching indentations or grooves in which the protrusions 34 on the upper surface of the first part 14 can positively locate to inhibit rotation of the first part 14 relative to the head of the fastener 12.

Figure 1C:
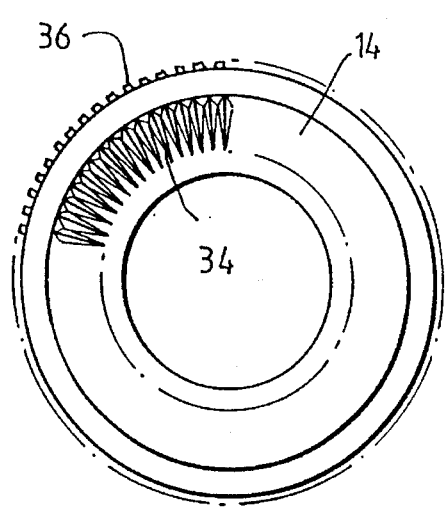
Figure 1D:
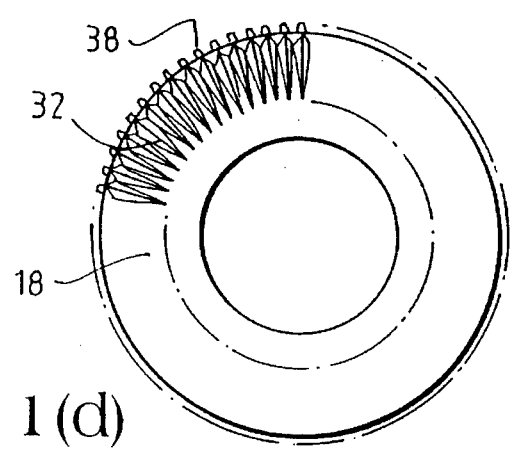

Although the protrusions 32 and 34 as illustrated in FIGS. 1(c) and (d) are provided over the entire circumference of the second and first parts 18, 14, it is possible to have only two or three such protrusions located symmetrically about the circumference of the first and second parts. Furthermore, in some applications it may not be necessary to provide matching indentations in the surface of the object to be fastened or in the head of the fastener, provided the material of the first and second parts 14, 18 is sufficiently hard to enable the protrusions to bite into the facing surfaces. Of course, in other applications no protrusions at all are required as there is sufficient friction between the abutting surfaces of the first and second parts, and the head of the fastener and the object to be fastened respectively.

The outer peripheries of the first part 14 and second part 18 may also be provided with positive gripping surfaces, for example, by having tooth-shaped projections 36, 38 respectively provided thereon. An alternative to the tooth-shaped projections 36, 38 is a plurality of grooves provided in the peripheral surface of both parts 14, 18, extending substantially parallel to the axis of the assembly. The primary function of the projections 36, 38 is to enable the two parts of the assembly to be locked together after the fastener has been tightened by providing a locking member 40 adapted to engage the peripheral surface of both the first and second parts 14, 18 to prevent rotation of the first and second parts relative to one another. Typically the fastener 12 cannot be removed with the locking member 40 in place. As illustrated in FIG. 1 (a), the locking member 40 may take the form of a circular cap or ring provided with grooves extending parallel to and matching the projections 36, 38 on the peripheral surfaces of the first and second parts 14, 18.

Advantageously, the locking cap or ring 40 also engages the head of the fastener 12 so that the bearing assembly is prevented from rotating relative to the fastener. Thus, for example, if the head of the fastener 12 is hexagonal in shape, the ring 40 is provided with a hexagonal aperture shaped to receive the head of the fastener 12 therein. The locking ring 40 can be placed over the fastener and bearing assembly manually after tightening, and can be easily removed prior to loosening the fastener. The locking ring 40 provides added security and also helps to prevent the fastener from loosening due to vibration. In the instance where a toothed fastener head is provided, the locking ring simply slides over both parts of the bearing and head of the fastener engaging the teeth thereon, even when using only a single tooth. By using teeth in place of conventional flat hexagon headed bolts, such a locking ring can be readily aligned on the separate parts. However, the locking ring 40 is not essential to the proper functioning of the bearing assembly, since in practice it has been found that provided sufficient hold-down pressure is exerted by the action of the fastener against the fastened object, the fastener will remain fastened due to the reactive tensioning thereof and the frictional grip on the thread of the fastener, even when subject to constant vibration.

Although not illustrated, the first and second parts 14, 18 of the bearing assembly may be coupled together, for example, by means of a hub or boss on which both parts are concentrically located and held with a circlip or other suitable means. The hub or boss may be a separate component or may be integral to one of either the first part 14 or second part 18. A face of either the first or second part 14, 18 may be recessed to receive the circlip or other suitable coupling to hold the assembly together. The advantage of having the first and second parts coupled together is that the assembly can be sold as a unitary component and used in a similar manner to a conventional washer.

Figures 2, 3A, 3B, 3C:
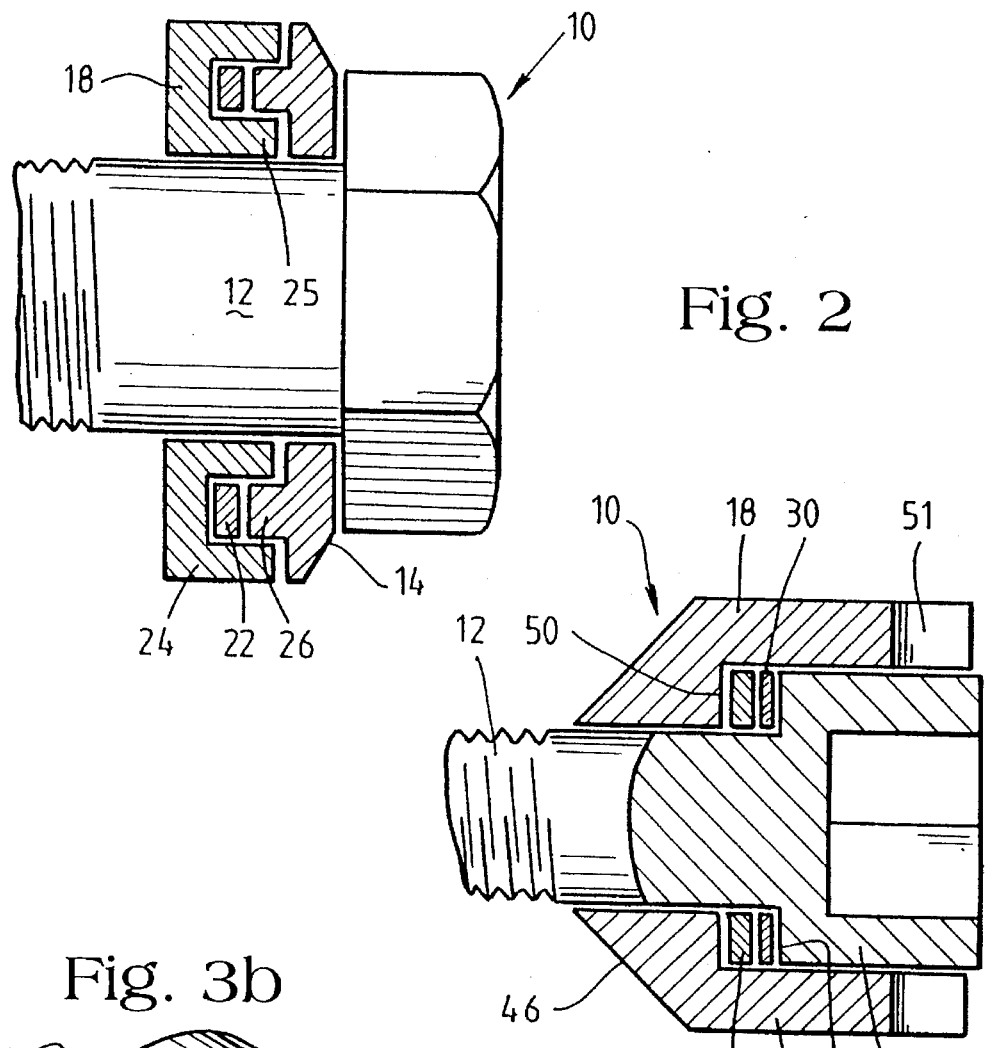
FIG. 2 illustrates a variant of the assembly shown in FIG. 1.
FIGS. 3(a), (b) and (c) illustrate a second embodiment of the fastener bearing assembly incorporated in a fastener.

FIG. 2 illustrates a variant of the fastener bearing assembly 10 of FIG. 1. The most significant difference is the provision of a second annular lip 25 provided on the second part 18, having an outside diameter slightly smaller or equal to the inside diameter of the solid dry lubricant annulus 22. The first and second annular lips 24, 25 in this embodiment thus form the female containment portion of the assembly for containing the annulus 22. The inside diameter of boss 26 on the first part 14 is larger than the outside diameter of lip 25, so as to be rotatably received in the annular recess between the lips 24 and 25. This embodiment of the bearing assembly is particularly useful in applications where the bearing assembly must be capable of withstanding extremely high compressive loads. Annular lips 24, 25 contain annulus 22 so that it cannot spread under loading.

The boss 26 is machined to a fine tolerance to minimise the volume of lubricant that can travel up the inside walls of the lips 24, 25 under compression. Advantageously, the walls of the boss 26 are tapered slightly so as to create a sealing effect to fully contain the lubricant material.

In the assembly 10 of FIG. 1 the annulus 22 is contained in the annular recess formed by lip 24 and the shank of the fastener 12, and only when an excessive load is applied is there a possibility that some of the dry lubricant material of annulus 22 will be extruded out onto the shank or into the thread of fastener 12.

In some applications it is desirable that both the first part and the second part have an inside diameter which is close fitting on the stud or bolt that passes through the assembly in order to ensure the two parts are accurately aligned in an axial direction. Accurate alignment may be important in order to ensure that the male portion rotates concentrically with the female portion, with the second pressure transmitting surface rotating freely with respect to the first pressure transmitting surface in substantially parallel planes. This ensures that pressure is transmitted evenly over the two facing surfaces with the solid lubricant annulus therebetween, and avoids a spreading action of the lubricant material if the fastener, for example, is not turning true on its thread.

FIGS. 3(a), (b) and (c) illustrate a second embodiment of the fastener bearing assembly according to the invention, in which the first part of the assembly 10 is provided integral to the head of the fastener 12 and comprises a male portion of the assembly. The second part 18 of the assembly, which comprises a female portion, has a cylindrical wall 44 within which the head of the fastener 12 is rotatably received. As can be seen in FIGS. 3(a) and (b), the second part 18 is also provided with an external frusto-conical surface 46 adapted to be received in the cone-shaped wheel fastener recess in a wheel. A solid dry lubricant in the form of an annulus 22 is located between a first pressure transmitting surface 48 on the lower face of the head portion of the fastener 12, and a second pressure transmitting surface 50 provided on the second part 18. Both the first and second pressure transmitting surfaces 48, 50 are provided lying substantially perpendicular to the longitudinal axis of the fastener 12. As with the first embodiment, a stainless steel washer 30 having at least one smooth pressure transmitting surface may also be provided, though it is not essential, with a smooth pressure transmitting surface of the washer bearing against the solid dry lubricant material 22. The fastener bearing assembly 10 illustrated in FIG. 3 functions in substantially identical manner to the bearing assembly of FIGS. 1 and 2.

As can be seen most clearly in FIG. 3(b) the second part 18 is provided with a plurality of grooves or channels 51 that can align with an aperture 52 provided in the head of the fastener 12 comprising the first part 14 of the bearing assembly. A locking pin (not shown) can be received through one of the channels 51 into aperture 52 to lock the two parts relative to each other.

In the assembly illustrated in FIG. 3 the frusto-conical surface 46 of the second part 18 may be provided with a positive gripping surface, similar to that provided on the faces of the first and second parts in the first embodiment illustrated in FIG. 2. Thus, the frusto-conical surface 46 may be provided with a plurality of radially extending protrusions similar to that illustrated in FIG. 1(d), designed to positively locate in corresponding grooves or indentations provided in the cone shaped wheel fastener holes in the wheel (not shown).

FIGS. 4(a) and (b) illustrate another embodiment of the fastener bearing assembly incorporated in a wheel nut 62, which is particularly suitable for racing car wheels. In this embodiment, the bearing assembly 60 is provided with a first part 61 integral to the head portion of the wheel nut 62 having a first pressure transmitting surface 64. A second part 66 in the form of a ring, has a second pressure transmitting surface 68, and is adapted to rotatably receive the first pressure transmitting surface 64 of the first part 61 in facing relation thereto. Located between the first and second pressure transmitting surfaces 64, 68 is a solid dry lubricant material in the form of an annulus 70, together with a thin stainless steel washer 72 having a smooth pressure transmitting surface that bears against the solid dry lubricant annulus 70. Although shaped somewhat differently, the first and second parts, the dry lubricant material and the washer perform essentially identical functions to the corresponding parts in the first embodiment described above. In the present embodiment, the head portion of the wheel nut 62 is provided with gear teeth 71 on its outer periphery to enable rapid tightening and loosening with an appropriately toothed fastening tool.

The fastener bearing assembly 60 of the present embodiment also preferably comprises a split ring member 74 provided with an annular lip 76 which is retained within an annular recess 78 provided in the part 61 of the head portion of the wheel nut. The purpose of the split ring member 74 is to keep the bearing assembly 60 coupled to the wheel nut when it is removed from shaft 84. Ring member 74 is held, for example, by rivets to the first part 66. The bearing assembly is thus provided integral to the wheel nut to facilitate ease of use.

The assembly further comprises a locking member 80 in the form of a light-gauge metal cup 80 having a plurality of resilient fingers 82 extending substantially parallel to the centre axis of the fastener and adapted to engage with the splines or teeth on the outer periphery of the wheel nut. The bolt or shaft 84 on which the wheel nut is received is splined and the locking member 80 is keyed to the spline on the shaft 84 so that when the fingers 82 engage with the teeth 71 of the wheel nut 62 the locking member 80 effectively locks the wheel nut to the shaft 84, as can be seen most clearly in FIG. 5(a). A second conventional washer 86 may be provided between the locking member 80 and the surface of the wheel 88 if desired.

When a tool, for example a pneumatic drill, having a toothed or splined socket adapted to fit the outer periphery of the wheel nut 62 is used to tighten or loosen the nut on the shaft 84, the socket engages the resilient fingers 82 of the locking member 80 and pushes them clear of the teeth 71 or splines on the outer periphery of the wheel nut as illustrated in FIG. 5(c). Thus, the wheel nut can be screwed onto the shaft 84 to obtain the necessary hold-down pressure and the moment the tool socket is removed from the nut the fingers 82 of the locking member engage with the outer periphery of the wheel nut to lock it to the shaft 84 securely. Due to the provision of the bearing assembly 60, approximately double the hold-down pressure can be achieved using the same torque currently applied to racing car wheel nuts. Due to the low coefficient of friction between the wheel nut and the wheel produced by the bearing assembly 60, the wheel nut 62 can also be removed quickly to facilitate rapid wheel changes. Since less torque is required to tighten the wheel nut on the shaft it is possible to ensure that adequate hold-down pressure is achieved every time.

Figure 5A:
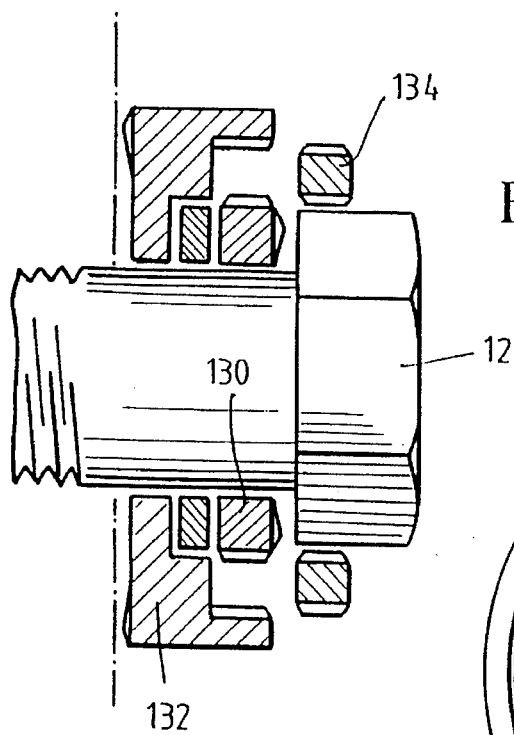
FIGS. 5(a) and (b) illustrate yet another embodiment of the fastener bearing assembly according to the invention; and, FIGS. 6(a) and 6(b) illustrate a still further embodiment of the fastener bearing assembly according to the invention.
Figure 5B:
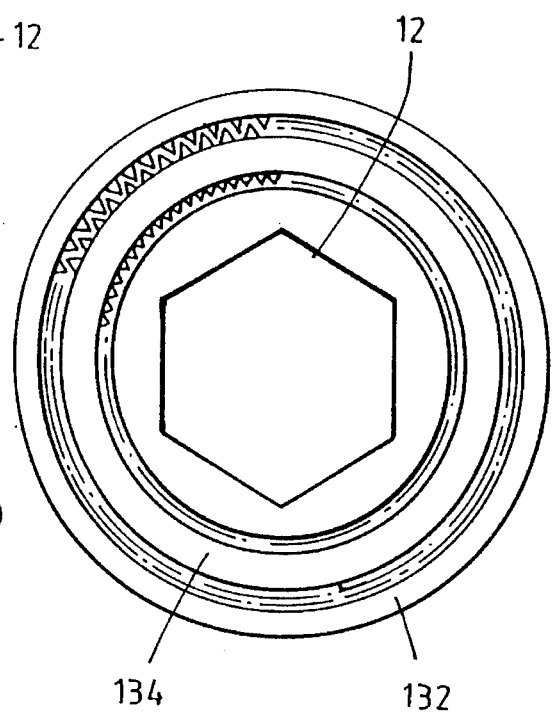

FIGS. 5(a) and (b) illustrates a still further embodiment of the fastener bearing assembly according to the invention, which is similar to that illustrated in FIG. 1(a) and FIG. 2 except that the first part 130 comprising the male portion is of constant diameter and is substantially smaller than the inside diameter of the second part 132 comprising the female portion. Both the inner peripheral surface of the second part 132 and the outer peripheral surface of the first part 130 are provided with gear teeth, and a locking ring 134 is provided having matching gear teeth on both its inner and outer circumferential surfaces. The locking ring is adapted to slide into the gap between the outer peripheral surface of the first part 130 and the inner peripheral surface of the second part 132 to lock the two parts together. Thus the locking ring 134 performs a similar function to the locking member 40 of the embodiment illustrates in FIG. 1(a). When the fastener is tightened and the locking ring is located in its locking position the fastener cannot be loosened without first removing the locking ring 134. Both the first and second parts 130, 132 are provided with positive gripping surfaces adapted to engage the fastener and the object to be fastened respectively, as with the embodiment illustrated in FIG. 1(a).

Figure 6A:
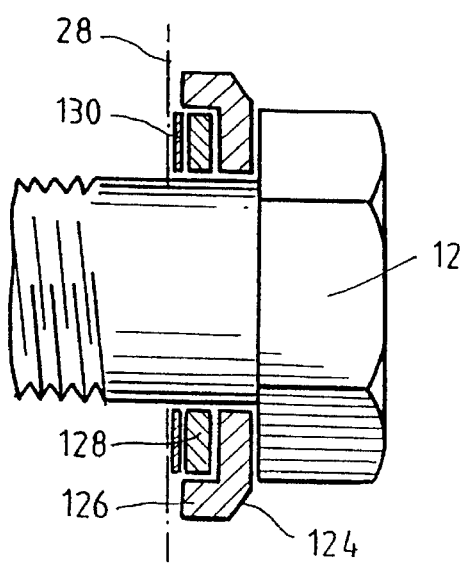
Figure 6B:
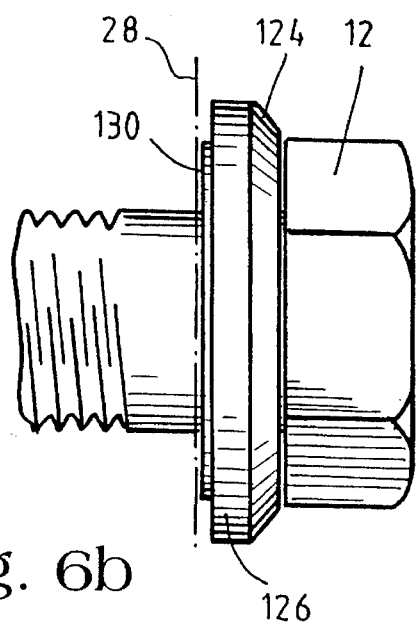

FIG. 6(a) and (b) illustrate a still further embodiment of the present invention in which a first part 124 of the bearing is provided with an annular lip 126 having an inside diameter sized to receive a solid dry lubricant annulus 128 therein. The first part 124 in this embodiment thus forms the female portion of the assembly. The assembly preferably further comprises a second part in the form of a washer 130 of hard, rigid material, for example, stainless steel, having at least one smooth pressure transmitting surface which bears against the solid dry lubricant material 128. The washer 130 preferably has an outside diameter smaller than the inside diameter of the annular lip 126, and is adapted to be rotatably received therein. The combined thickness of the lubricant material 128 and washer 130 is preferably selected so that the annular lip 126 does not engage the surface 132 of the object to be fastened, but remains free to rotate relative thereto.

The bearing assembly of FIG. 9 operates in a similar manner to that of FIGS. 1 and 2, the first part 124 being free to rotate with the head of fastener 12 and the second part 130 being held stationary relative to the fastened object so that the lubricant material 128 acts as a bearing between the head of the fastener 12 and the surface 132 of the fastened object. In some circumstances the second part may be provided integral to the object to be fastened, for example, by a smooth raised annulus surrounding the aperture in the object to be fastened, in which case the washer can be dispensed with. The first part 124 of the assembly may also be provided integral to the head of the fastener 12 if desired.

Anyone of the above-described embodiments may be further provided with pressure indicating means to indicate when the required hold-down pressure or torque has been reached. This helps the user to know how much torque to apply and avoid the situation where the fastener is continued to be tightened beyond the maximum required torque for a particular application. The pressure indicating means may be provided by metal to metal contact of the modified surfaces of the first and second parts, causing an audible clicking sound or mechanically limiting further rotation. The modified surfaces may include serrations shaped to allow release of pressure by loosening, or to permanently lock the two parts in position once passed over. Alternatively, the indicating means may be provided by having the lubricant material arranged to become visible, as a compressive force is applied to the bearing, at the outer peripheral edge of the assembly between the first and second parts.

In an alternative embodiment, or in addition to the above, an O-ring of, for example, plastics material may be provided in an annular groove in one part of the assembly. The annular groove is provided adjacent the periphery of either or both the first and second parts and is of larger diameter than the solid dry lubricant material therebetween. When the bearing assembly is subject to a compressive load the O-ring is squashed and can serve to indicate when an excessive torque or the correct torque or hold-down pressure has been applied. The O-ring may comprise a two-part adhesive resin which when compressed, causes mixing of the two parts of the adhesive resin which then causes the resin to set and lock the first and second parts of the assembly together. This may be particularly advantageous where the fastener is permanently fastened to an object subject to vibration, for example, high tension electric bus bars.

The solid dry lubricant material employed in each of the above described embodiments may be any suitable solid dry lubricant having a low coefficient of friction, for example, a fluoropolymer plastic having a low coefficient of friction such as PTFE, commonly known as teflon. Advantageously, the PTFE may be combined with powdered glass in order to produce a dry lubricant material having a minimum coefficient of friction and capable of withstanding a large compressive force. Dry lubricant washers of this kind are known, and are manufactured, for example, by UNESCO.

It is not essential that the solid dry lubricant material be provided as a separate integer in the bearing assembly. It may, for example, be provided integral to said second part, the second part being itself made wholly or partly of said dry lubricant material or in the form of a composite. It is essential that the dry lubricant material act to reduce friction between the respective pressure transmitting surfaces of the head portion of the fastener and the first part of the friction reducing means respectively.

Now that numerous embodiments of the fastener bearing assembly and fasteners incorporating same have been described in detail, it will be apparent that the present invention provides significant advantages over conventional fasteners, particularly automotive wheel and engine head fasteners. The principal advantage of the fastener bearing assembly is that it enables a fastener to be tightened or loosened with significantly reduced torque to achieve the same pretensioning as a conventional fastener.

It will be apparent to persons skilled in the mechanical arts that numerous variations and modifications may be made to the described embodiments of the toothed fastener, in addition to those already described, without departing from the basic inventive concepts. All such variations and modifications are to be considered within the scope of the present invention, the nature of which is to be determined from the foregoing description and the appended claims.

I claim:

1. A fastener bearing assembly for reducing the turning friction between a head of a fastener and an object to be fastened by the fastener, the assembly comprising:

a first part having a first pressure transmitting surface;

a second part having a second pressure transmitting surface, and adapted to rotatably receive said first pressure transmitting surface of the first part in facing relation thereto;

a solid dry lubricant material having a low coefficient of friction provided to reduce friction between said first and second pressure transmitting surfaces whereby, in use, said first part can rotate with the head of the fastener and said second part can be held stationary relative to the fastened object so that said dry lubricant material can act as a bearing between the head of the fastener and the fastened object; and containment means provided in connection with said first and/or second parts for containing said solid dry lubricant material therein whereby, in use, said solid dry lubricant material is capable of withstanding substantial compressive loads without being extruded from between the first and second parts.

2. A fastener bearing assembly as claimed in claim 1, wherein said solid dry lubricant material is provided in the form of a separate annulus located between said first and second pressure transmitting surfaces.

3. A fastener bearing assembly as claimed in claim 2, wherein one of said first or second parts is provided with an annular lip forming a female containment portion, said annular lip having an inside diameter sized to receive said annulus therein.

4. A fastener bearing assembly as claimed in claim 1, wherein the other one of said first or second parts comprises a male portion having an outside diameter smaller than said inside diameter of the annular lip, and adapted to be rotatably received within said female portion, whilst at the same time in pressure transmitting contact with the solid dry lubricant material.

5. A fastener bearing assembly as claimed in claim 4, wherein said one of said first or second parts forming said female containment portion is further provided with a second annular lip having an outside diameter sized to receive said annulus therein, and wherein said male portion has an inside diameter smaller than said outside diameter of the annular lip.

6. A fastener bearing assembly as claimed in claim 4, wherein said first part of the assembly is provided integral to the head or body of the fastener itself and comprises the male portion.

7. A fastener bearing assembly as claimed in claim 4, wherein said first part is in the form of a washer and comprises the male portion.

8. A fastener bearing assembly as claimed in claim 1, further comprising a washer of hard, rigid material having at least one smooth pressure transmitting surface, said washer also typically being provided between the first and second pressure transmitting surfaces with said smooth pressure transmitting surface bearing against said solid dry lubricant material.

9. A fastener bearing assembly as claimed in claim 1, further comprising a locking member adapted to engage a surface of both the first and second parts to prevent rotation of the first and second parts relative to one another whereby, in use, said fastener can be inhibited from loosening due to vibration.

10. A fastener bearing assembly as claimed in claim 9, wherein the locking member engages the head of the fastener so that the assembly is prevented from rotating relative to the fastener.

11. A fastener bearing assembly as claimed in claim 1, wherein the first part is provided with a positive gripping surface adapted to engage the head of the fastener and the second part is likewise provided with a positive gripping surface adapted to engage the object to be fastened.

* * * * *